May 27, 1969
SHINYA KOSAKA ET AL
3,447,056
APPARATUS FOR CONTROLLING THE SPEED OF A DIRECT CURRENT MOTOR
Filed Nov. 3, 1966
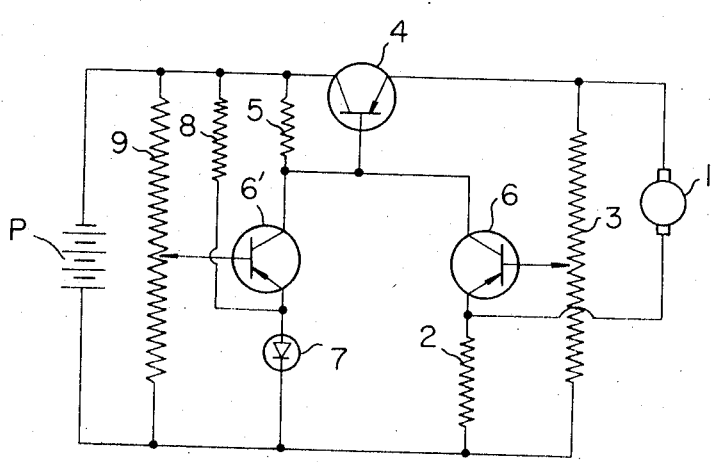
INVENTORS.
SHINYA KOSAKA
KENZI SASAGURI
BY
*Kurt Kelman*
AGENT

# United States Patent Office 3,447,056
Patented May 27, 1969

3,447,056
APPARATUS FOR CONTROLLING THE SPEED
OF A DIRECT CURRENT MOTOR
Shinya Kosaka, Fuchu-shi, Tokyo, and Kenzi Sasaguri,
Tokyo, Japan, assignors to Olympus Optical Co., Inc.,
Tokyo, Japan
Filed Nov. 3, 1966, Ser. No. 591,861
Claims priority, application Japan, Nov. 9, 1965,
40/68,300
Int. Cl. H02k 27/20, 23/66
U.S. Cl. 318—332                                   1 Claim

ABSTRACT OF THE DISCLOSURE

A motor speed controlling circuit including a serial resistor and a control transistor in series with a motor and a source of current. Shunt resistors are connected in parallel across the motor and the current source. Detecting and amplifying transistors have their bases connected to the respective shunt resistors and their collectors connected to the base of the control transistor. The emitter of one detecting and amplifying transistor is connected to the circuit between the serial resistor and the motor, and a constant voltage diode is provided between the power source and the emitter of the second detecting and amplifying transistor.

This invention relates to an apparatus for controlling the speed of a direct current motor and particularly relates to an apparatus in which the speed of a miniaturized direct current motor is kept constant by means of an electrical circuit, regardless of any variation in the load on the motor or the voltage of its electrical source.

Heretofore, the speed of miniaturized direct current motors has been controlled by mechanical, governor-controlled switches. However, such mechanical controls possess some disadvantages such as noise due to sparking, defective operation and complication of the motor construction.

An object of this invention is to provide an apparatus for controlling the speed of a miniaturized direct current motor and maintaining the speed constant, regardless of any variation in the load on the motor or the voltage of its electrical source.

Another object of this invention is to provide an apparatus which eliminates the above outlined disadvantages of conventional mechanical speed controls.

With the foregoing more important objects and features in view and such other objects and features which may become apparent as this specification proceeds, the invention will be understood from the following description taken in conjunction with the accompanying drawing, wherein the single drawing figure is a circuit diagram of the motor speed controlling apparatus of the invention.

As shown in the drawing, the reference numeral 1 designates the armature of a direct current motor, the armature being rotatable in a magnetic field generated by a stator (not shown) in the conventional manner. One terminal of the motor armature is connected in series with a resistor 2 to one side of a source of current P, the other side of the latter being connected to the collector of a controlling transistor 4. The emitter of the transistor 4 is connected to the other terminal of the motor armature 1.

A shunt resistor 3 is connected in parallel across the motor armature and the serial resistor 2, the resistor 3 having a sliding contact connected to the base of a first detecting and amplifying transistor 6. The emitter of the transistor 6 is connected to the circuit at a point between the armature 1 and the serial resistor 2. A second shunt resistor 9 is connected in parallel across the power source P and has a sliding contact connected to the base of a second detecting and amplifying transistor 6'. The emitter of the transistor 6' is connected to a resistor 8 and to one side of a constant voltage diode 7, the other side of the latter being connected to the circuit at a point between the resistors 2 and 9.

The collectors of the two transistors 6 and 6' are connected to the base of the controlling transistor 4. The base of the transistor 4 has a biasing resistor 5 which, like the resistor 8, is connected to that side of the current source P which includes the transistor 4.

The operation of the motor speed controlling circuit is as follows:

At first, it may be assumed that the load applied to the motor is increased. The speed of the motor decreases to reduce the counter electromotive force so that the current flowing through the armature 1 increases. The voltage drop across the resistor 2 increases and, therefore, the voltage between the base and the emitter of the transistor 6 decreases to decrease the collector current thereof. This increases the base current of the transistor 4 to the effect that the internal resistance between the emitter and the collector of transistor 4 is decreased. The decrement of the internal resistance of the transistor 4 serves to increase the voltage applied to the armature 1 to increase the speed of the motor. Thus the speed of the motor is kept substantially at a constant value.

Next, it may be assumed that the voltage of the electrical source is increased. The voltage applied to armature 1 increases and the speed of the motor increases. The increment of the voltage of the electrical source is detected by means of the resistor 9 and the increment is compared with the Zener voltage of the diode 7. After the comparison, the voltage difference is applied to the base and to the emitter of the transistor 6', in order to increase the voltage across the base and the emitter thereof. The collector current increases so that the base current of the transistor 4 decreases and this results in an increased internal resistance between the emitter and the collector of the transistor 4 so that the voltage applied to the armature 1 is decreased by the increment of the internal resistance. Therefore, the speed of the motor decreases and is kept substantially at a constant value.

Alternatively, when the motor load is decreased or the voltage of the electrical source is decreased, transistors 4, 6 and 6' operate in a manner opposite to that described above, to control the voltage applied to the armature and maintain the motor speed substantially constant.

By properly selecting the characteristic features of the transistors 4, 6 and 6', the resistances of the resistors 2, 3, 5 and 9 and the Zener voltage of the diode 7, the speed of a motor can be kept at a constant value regardless of any variation in the load on the motor or the voltage of the electrical source.

It will be apparent from the foregoing that the motor speed control apparatus of the invention does not utilize any mechanical switching means, or the like, and therefore is silent and durable in operation. Also, it has a very compact arrangement and lends itself to economical manufacture.

What is claimed is:
1. An apparatus for controlling and maintaining substantially constant the speed of a direct current electric motor having an armature, said apparatus comprising a serial resistor and a controlling transistor in circuit with the motor armature and a source of current, a first shunt resistor connected in parallel across the motor armature and said serial resistor, a first detecting and amplifying transistor having its base connected to a sliding contact of said first shunt resistor and having its emitter connected to the circuit at a point between the motor armature and said serial resistor, a second shunt resistor connected in parallel across the current source, a second detecting and amplifying transistor having its base connected to a sliding contact of said second shunt resistor, a constant voltage diode connected to the current source and to the emitter of said second detecting and amplifying transistor, the base of said controlling transistor being connected to the collectors of the first and second detecting and amplifying transistors.

References Cited

UNITED STATES PATENTS

| | | |
|---|---|---|
| 3,069,617 | 12/1962 | Mohler. |
| 3,250,979 | 5/1966 | Shaw. |
| 3,309,596 | 3/1967 | Limley _____ 318—345 |

B. DOBECK, *Primary Examiner.*

R. J. HICKEY, *Assistant Examiner.*

U.S. Cl. X.R.

318—345; 323—20